United States Patent [19]

Kobayashi

[11] Patent Number: 5,070,394

[45] Date of Patent: Dec. 3, 1991

[54] IMAGE SIGNAL PROCESSING DEVICE

[75] Inventor: Kaoru Kobayashi, Yokohama, Japan

[73] Assignee: Victor Company of Japan, Ltd., Yokohama, Japan

[21] Appl. No.: 501,847

[22] Filed: Mar. 30, 1990

[30] Foreign Application Priority Data

Mar. 31, 1989 [JP] Japan .................... 1-81133

[51] Int. Cl.⁵ ........................... H04N 9/535
[52] U.S. Cl. .................... 358/11; 358/21 R
[58] Field of Search ............ 358/11, 12, 36, 21, 358/140

[56] References Cited

U.S. PATENT DOCUMENTS 4,521,802  6/1985  Ikeda ...................... 358/11
4,677,482  6/1987  Lewis, Jr. ................ 358/11
4,698,675 10/1987  Casey ..................... 358/11

FOREIGN PATENT DOCUMENTS 0010021  1/1977  Japan .

Primary Examiner—James J. Groody
Assistant Examiner—David E. Harvey
Attorney, Agent, or Firm—Fleit, Jacobson, Cohn, Price, Holman & Stern

[57] ABSTRACT

An image signal processing device comprising a luminance signal output section for outputting an interlaced scanning actual line luminance signal and an interpolation line luminance signal, a color signal output section for outputting an interlaced scanning actual line color signal and an interpolation line color signal, and a control section for controlling the color signal output section, thus to output, as an interpolation line color signal, an interlaced scanning actual line color signal proceeding or succeeding the interpolation line or an average value of color signals of interlaced scanning lines preceding and succeeding the interpolation line.

8 Claims, 4 Drawing Sheets

IMAGE SIGNAL PROCESSING DEVICE

FIELD OF THE INVENTION

This invention relates to an image signal processing device, and more particularly to an image signal processing device in a television system of the interlace scanning system.

BACKGROUND OF THE INVENTION

Various attempts are made in regard to realization of high picture quality of television. For example, a conversion to a progressive scanning system, etc. shown in "High Quality Digital Television" (Toshiba Review, Vol. 42, No. 12, 1987) is a representative system. In accordance with this system, in converting an interlaced scanning television signal to progressive or sequential scanning (i.e., non-interlaced scanning) television signal, when there is a motion in a pictorial image, an interpolation signal is generated on the basis of signals within each field, and while when there is no movement in a pictorial image, an interpolation signal is generated on the basis of signals over a plurality of fields. This system is called a motion adaptive scanning line interpolation. Since implementation of such a conversion can result in improved vertical resolution and reduced flicker, the picture quality of the television can be improved to much extent.

FIG. 3 is a block diagram of an image signal processing device as the background art for realizing such a scanning line interpolation. Especially, there is shown an arrangement to respectively interpolate a luminance signal and a color signal in accordance with different systems, thus converting an interlaced scanning television signal to a progressive scanning television signal.

As shown in FIG. 3, a television signal is inputted as separate signal inputs of a luminance signal input $Y_{IN}$ and a color signal input $C_N$. The luminance signal input $Y_{IN}$ thus inputted is delayed by one horizontal scanning period through an 1H delay line 2. Further, this luminance signal input $Y_{IN}$ is delayed by a time period corresponding to one field through a field memory 4. Namely, the signal obtained from the field memory 4 is a signal obtained by delaying the luminance signal input $Y_{IN}$ by a time period corresponding to one field. On the other hand, the luminance signal input $Y_{IN}$ is added to an output from the 1H delay line 2, i.e., a luminance signal input $Y_{IN}$ preceding 1H before at an adder circuit 6, and is then halved at a ½ circuit 8. Namely, an output from the ½ circuit 8 is an average value of the luminance signal input $Y_{IN}$ and the luminance signal input $Y_{IN}$ preceding 1H before. A selection circuit 10 selects either an output from the field memory 4 or an output from the ½ circuit 8 by a motion control signal M outputted from means (not shown) in correspondence with motions of a pictorial image of the television signal. Namely, when there is a motion in a television image, the selection circuit 10 selects an output from the ½ circuit 8, while when there is no motion in that image, it selects an output from the field memory 4, i.e., a signal preceding one field before. The luminance signal input $Y_{IN}$ and an output from the selection circuit 10 are inputted to first in first out (FIFO) circuits 12Y and 14Y, respectively. These circuits alternately output by a time period corresponding to 1H on the basis of a scan rate of the progressive scanning. Namely, by switching a changeover switch 16Y to alternately take out the both outputs, a luminance signal output $Y_{OUT}$ for forming a non-interlaced frame can be provided.

On the other hand, the inputted color signal input $C_{IN}$ is inputted to an 1H delay line 18. The color signal input $C_{IN}$ is added to a color signal input $C_{IN}$ delayed by 1H which is an output from the 1H delay line 18 at an adder circuit 20. An output from the adder circuit 20 is inputted to a ½ circuit 22. Thus, an average value of the original color signal input $C_{IN}$ and the color signal input $C_{IN}$ delayed by 1H is provided from the ½ circuit 22. Furthermore, an output from the 1H delay line 18 and an output from the ½ circuit are inputted to FIFOs 12c and 14c, respectively. Thus, a color signal output $C_{OUT}$ is provided through a switch 16c in a manner similar to the above. Namely, by switching of the switch 16c, outputs from the FIFOs 12c and 14c are alternately outputted. That is, an output from the FIFO 12c is outputted as a color signal of the line signal, and an output from the FIFO 14c is outputted as a color signal of the interpolation line.

The operation and the effect of the device thus constructed will be described in more detail with reference to FIGS. 4A to 4C. FIG. 4A is an explanatory view of a television frame. In this figure, there is shown the manner in which a plurality of horizontal scanning lines n, n+1, n+2, n+3, n+4, ... are arranged in a vertical direction V to form one frame. In the case of a typical interlaced scanning, the horizontal scanning lines n, n+2, n+4, ... and the horizontal scanning lines n+1, n+3, ... belong to different fields, respectively, and are displayed on the screen at one field time interval of the television signal. On the contrary, in the progressive scanning system, the horizontal scanning lines n, n+1, n+2, n+3, n+4, ... are all displayed as one frame. For this reason, it is required to generate signals of interpolation horizontal scanning lines for filling the interlaced scanning portions by interpolation, etc. FIGS. 4B and 4C show the relationship of the amplitudes of respective horizontal scanning lines n, n+1, n+2, n+3, n+4, ... In these figures, there are shown the relationship between the amplitudes of actual scanning lines (solid lines) of a luminance signal and the amplitudes of interpolation scanning lines (broken lines) thereof and the relationship between the amplitudes (●) of actual scanning lines of a color signal and the amplitudes (○) of interpolation scanning lines thereof, respectively.

In the above-mentioned background art, motion-adaptive interpolation is applied to the luminance signal. A motion-adaptive interpolation signal is obtained from a motion detection circuit (not shown). Switching of the selection circuit 10 by this motion control signal M leads to switching of the motion-adaptive operation.

When there is no motion in a television image, the selection circuit 10 selects an output from the field memory 4 to synthesize two fields into one non-interlaced frame through FIFOs 12Y and 14Y to output the synthesized frame. Namely, since a pictorial image including no motion has an extremely high correlation between fields, interfield interpolation is carried out.

On the contrary, in the case where there is a motion in a television image, since pictorial images of respective fields are naturally different to one another, an intraframe interpolation is carried out. In the intrafield interpolation, two horizontal signals of interlaced scanning are added by the 1H delay line 2 and the adder circuit 6. An average value of the added signal is taken at the ½ circuit 8. Thus, an interpolation signal between lines is provided. This interpolation signal is selected by a motion control signal M at the selection circuit 10, and is then inputted to the FIFO circuit 14Y. As a luminance signal output $Y_{OUT}$, a progressive scanning signal which has been subjected to intrafield interpolation is provided.

On the other hand, in the case of a color signal, only an intrafield interpolation is implemented thereto irrespective of whether or not there is a motion. Namely, two horizontal signals of interlaced scanning of the color signal input $C_{IN}$ are added by the 1H delay line 18 and the adder circuit 20. An average value of the added signal is taken at the ½ circuit 22. Thus, an interpolation signal between lines is provided. This interpolation signal is outputted as a progressive scanning color signal output $C_{OUT}$ through FIFOs 12c and 14c. Thus, a progressive scanning signal which has been subjected to intrafield interpolation is provided.

The image signal processing device of the background art has been constructed above. For this reason, where an intrafield interpolation is carried out, both the luminance signal and the color signal generate interpolation signals on the basis of the correlation with upper and lower lines of the horizontal scanning signal, resulting in no extreme separation between the luminance signal and the color signal. On the contrary, in the case where an interfield interpolation of the luminance signal is carried out on a frame in which there is less motion, there may be produced a difference resulting from a difference between interpolation schemes for the luminance signal and the color signal. Namely, when a television screen is viewed along the line A of FIG. 4A, there may occur instances where the luminance signal level varies rapidly in a vertical direction between an interpolated line and the upper or lower actual line as shown in FIGS. 4B and 4C. On the contrary, since only an intrafield interpolation is implemented to the color signal, only a level of an average value between actual lines occurs as a level of an interpolated line. This leads to the problem that color bleeding and color missing may occur in the cases of FIGS. 4B and 4C, respectively. Thus, spreading in upper and lower directions of color considerably lowers the quality of an image. On the other hand, while it is sufficient for the color signal to detect its motion to employ an interpolation method similar to that of the luminance signal, this results in the problem that the configuration becomes complicated, leading to an extremely high cost.

SUMMARY OF THE INVENTION

This invention has been made in view of the above, and its object is to provide an image signal processing device in which, with a view to converting a interlaced scanning television signal to a progressive scanning television signal, a circuit of a relatively simple configuration is used to thereby carry out an motion-adaptive interpolation of a color signal, thus making it possible to prevent bleeding in upper and lower directions of color or color missing.

The color signal of an interpolation line for making an interpolation between interlaced scanning lines is determined as follows. Namely, respective correlations between the interpolation line and a scanning line preceding thereto and between the interpolation line and a scanning line succeeding thereto are determined by control means. A color signal in an interpolation line is determined as repetition of a color signal of a scanning line preceding or succeeding thereto, or an average of a color signal of a scanning line preceding or succeeding thereto. Thus, bleeding of a color in a vertical direction is suppressed.

DESCRIPTION OF THE PREFERRED EMBODIMENTS

Preferred embodiments of this invention will now be described with reference to the attached drawings.

Figure 1:
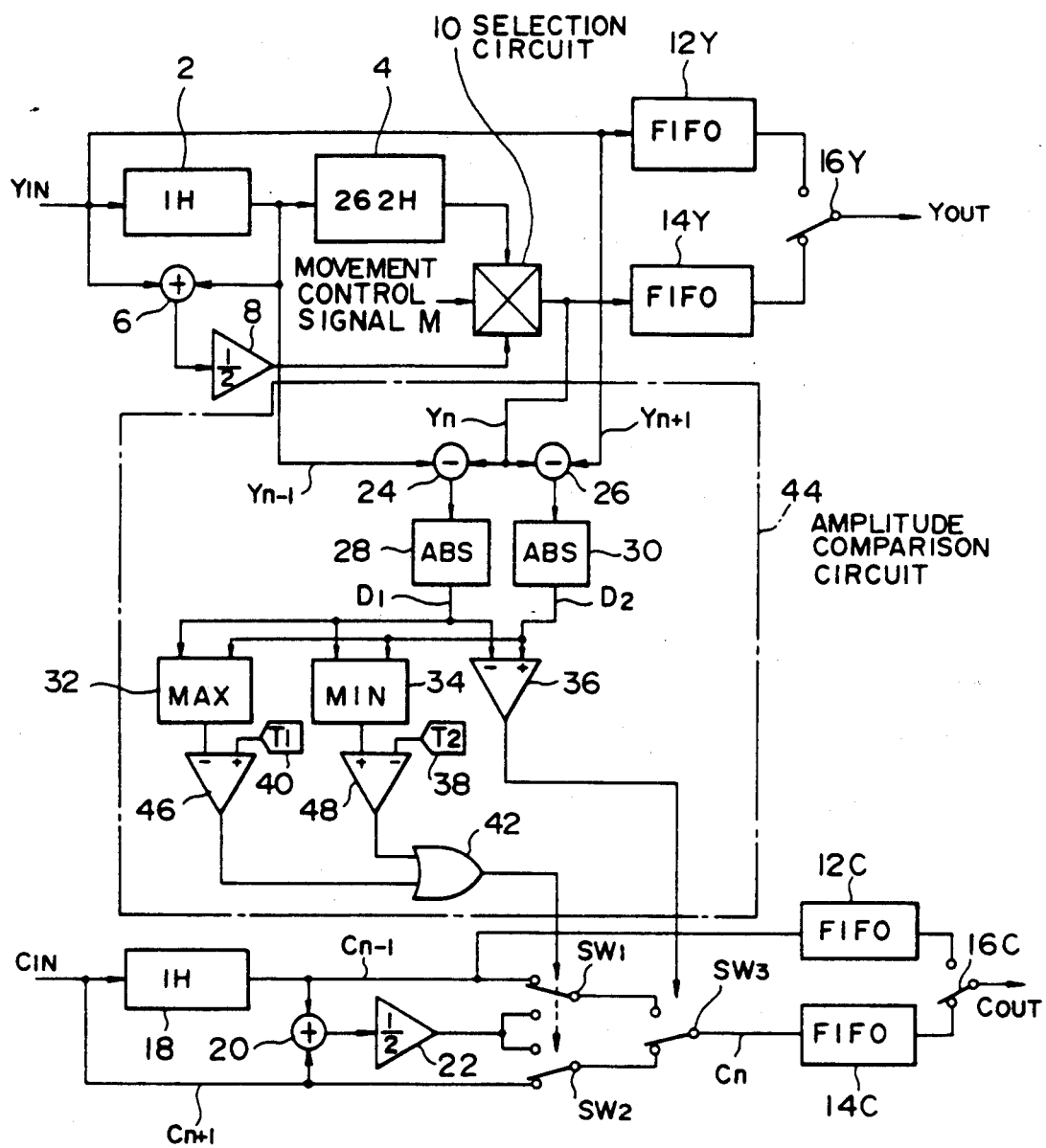
FIG. 1 is a block diagram showing an image signal processing device according to this invention.
Figure 3:
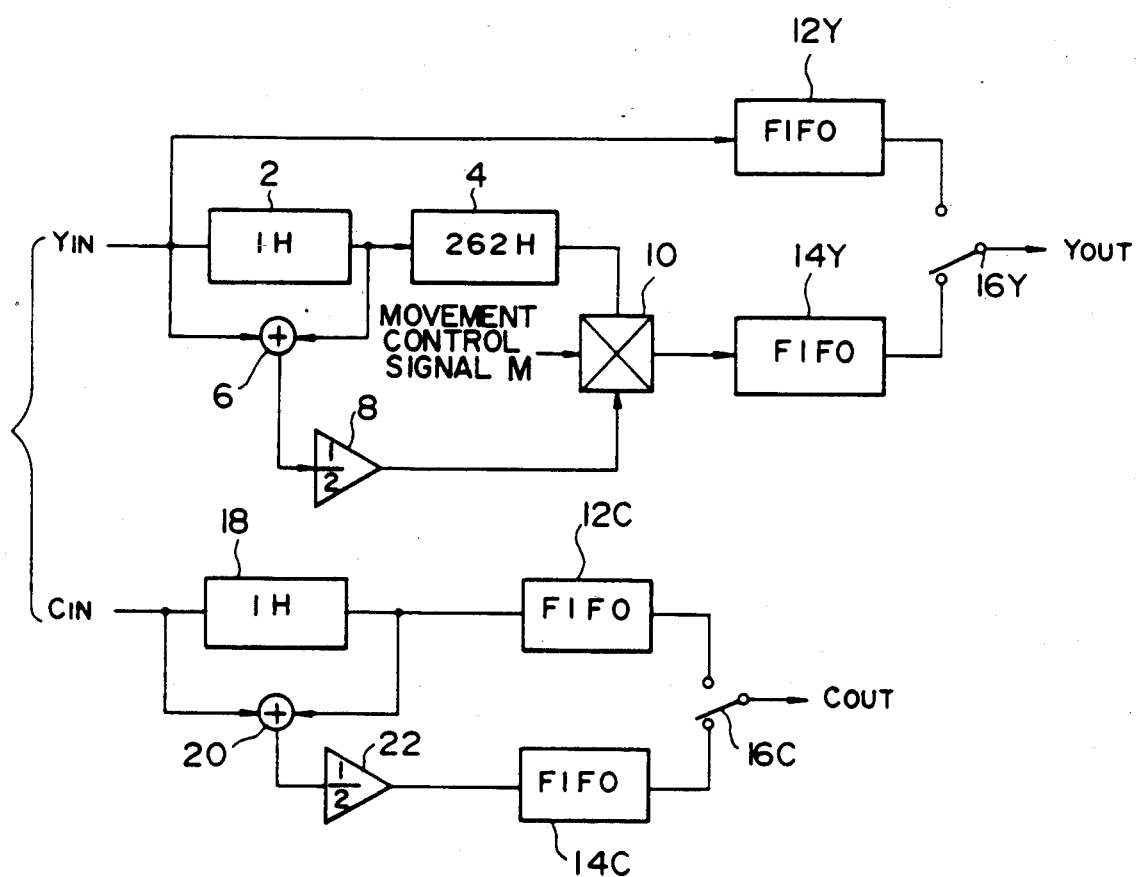
FIG. 3 is a block diagram showing an image signal processing device of a background art.
Figure 4A:
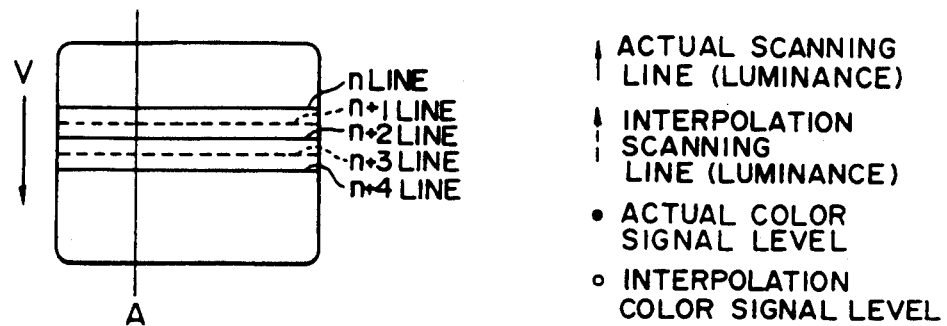
FIGS. 4A to 4C are explanatory views showing the operation and the effect of the device shown in FIG. 3, respectively.
Figures 4B, 4C:
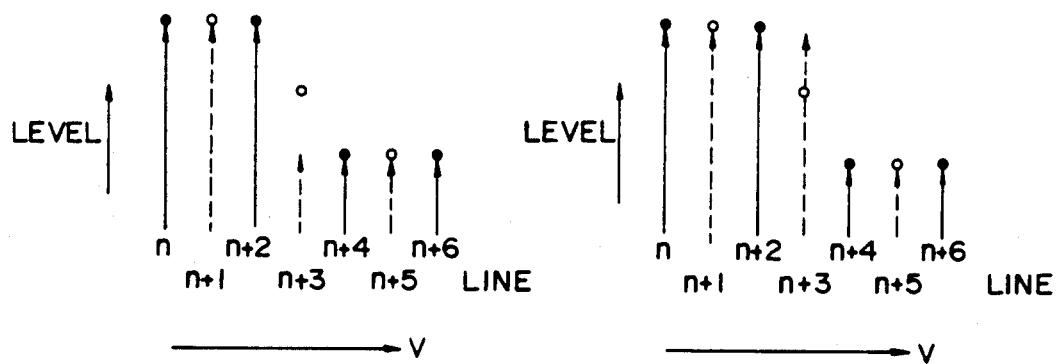

FIG. 1 is a block diagram showing an image signal processing device according to an embodiment of this invention. In FIG. 1, portions designated by the same reference numerals as those in FIG. 3 represent the same components, respectively. In FIG. 1, an amplitude comparison circuit 44 serves to judge respective correlations between a luminance signal interpolated for progressive scanning and a luminance signal of a line positioned thereabove and between the liminance signal interpolated and a luminance signal of a line positioned therebelow. Namely, comparison between an interpolation luminance signal (luminance signal Yn) selected by the selection circuit 10 and a luminance signal input $Y_{IN}$ (luminance signal $Y_{n+1}$) is performed. In addition, comparison between the selected luminance signal Yn and a luminance signal input $Y_{IN}$ (luminance signal $Y_{n-1}$) delayed by 1H through the 1H delay line 2 is also performed. Depending upon these compared results, switches $SW_1$, $SW_2$ and $SW_3$ are controlled.

Namely, the color signal input $C_{IN}$ is separated into a color signal $C_{n+1}$ taken out as it is and a color signal $C_{n-1}$ delayed by 1H through the 1H delay line 18. These signals ($C_{n-1}$, $C_{n+1}$, are applied to switches $SW_1$ and $SW_2$, respectively. By these switches $SW_1$, $SW_2$, the signals $C_{n-1}$, $C_{n+1}$ and an average value $(C_{n+1}+C_{n-1})/2$ obtained from the adder circuit 20 and the ½ circuit 22 are switched. On the other hand, the switch $SW_3$ selects either of signals selected by the switches $SW_1$ and $SW_2$. In the amplitude comparison circuit 44, computation is performed as follows. Namely, a difference between the luminance signal Yn and the luminance signal $Y_{n-1}$ is computed by a subtracter 24. Further, a difference between the luminance signal Yn and the luminance signal $Y_{n+1}$ is computed by a subtracter 26. Respective computed results are subjected to absolute value conversion by the absolute value circuits 28 and 30, respectively. Thus, computed results $D_1$ and $D_2$ are provided. A comparison circuit 36 controls the switch $SW_3$ on the basis of the relationship between the magnitudes of these computed results $D_1$ and $D_2$. On the other hand, the computed results $D_1$ and $D_2$ are inputted to a maximum value detection circuit 32 and a minimum value detection circuit 34. By these maximum and minimum value detection circuits 32 and 34, a larger one of the computed results $D_1$ and $D_2$ inputted thereto and a smaller one thereof are selectively outputted, respectively. An output from the maximum value detection circuit 32 is, at a comparison circuit 46, compared with a reference value $T_1$ set by a setter 40. When the output from the circuit 32 is smaller than the reference value $T_1$, a signal of high level is outputted from the comparison circuit 46. As a result, switched $SW_1$ and $SW_2$ are switched through a logical sum (OR) circuit 42. On the other hand, an output from the minimum value detection circuit 34 is compared, at a comparison circuit 48, with a reference value $T_2$ which is higher than the reference value $T_1$ and is set by a setter 38. As a result, when the output from the circuit 34 is larger than the reference value $T_2$, a signal of high level is outputted from the comparison circuit 48. Thus, switches $SW_1$ and $SW_2$ are switched through the logical sum circuit 42.

Figure 2A:
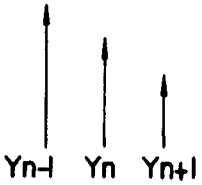
FIGS. 2A to 2D are explanatory views showing the operation and the effect of the device shown in FIG. 1, respectively.
Figure 2B:
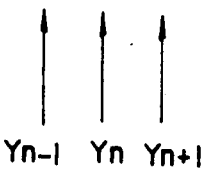
Figure 2C:
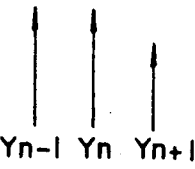
Figure 2D:
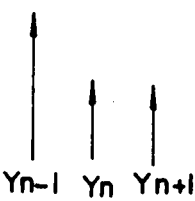

The operation and the effect of the above-mentioned device will be described in more detail with reference to the explanatory view shown in FIGS. 2A to 2D. In this connection, FIG. 2A shows a case where there is no correlation between luminance signals $Y_{n-1}$, Yn and $Y_{n+1}$. FIG. 2B shows a case where there is a high correlation between luminance signals $Y_{n-1}$, Yn and $Y_{n+1}$. FIG. 2C shows a case where there is a high correlation between luminance signals $Y_{n-1}$ and Yn and there is a low correlation between luminance signals Yn and $Y_{n+1}$. In addition, FIG. 2D shows a case where there is a low correlation between luminance signals $Y_{n-1}$ and Yn and there is a high correlation between luminance signals Yn and $Y_{n+1}$.

In FIG. 1, the luminance signal Yn outputted from the selection circuit 10 is an interpolated luminance signal. On the other hand, the luminance signal $Y_{n+1}$ directly derived from the luminance signal input Yn is a luminance signal positioned below, by one line, the interpolated luminance signal Yn. Furthermore, the luminance signal $Y_{n-1}$ obtained by passing the luminance signal input $Y_{IN}$ through the 1H delay line 2 is a luminance signal positioned above, by one line, the interpolated luminance signal Yn. The subtracter 24 and the absolute value circuit 28 detect an absolute value $D_1$ of a difference between luminance signals $Y_{n-1}$ and Yn, i.e., a correlation therebetween. It can be said that the smaller the computed result $D_1$ is, the higher the correlation therebetween is. On the contrary, the subtracter 26 and the absolute value circuit 30 detect an absolute value $D_2$ of a difference between luminance signals Yn and $Y_{n+1}$, i.e., a correlation therebetween. It can be said that the smaller the computed result $D_2$ is, the higher the correlation therebetween is.

In the case shown in FIG. 2A, since there is no correlation between lines of luminance signals $Y_{n-1}$, Yn and $Y_{n+1}$, computed results $D_1$ and $D_2$ indicate a value larger than a predetermined level. In this case, a larger one of computed results $D_1$ and $D_2$ is inputted from the maximum value detection circuit 32 to the comparison circuit 46, and a lower one thereof is inputted from the minimum value detection circuit 34 to the comparison circuit 48. Both inputs $D_1$ and $D_2$ are considered to be above reference values $T_1$ and $T_2$. For this reason, an output of high level is provided only from the comparison circuit 48. That output is applied to the switches $SW_1$ and $SW_2$ through the logical sum circuit 42, thus to switch these switches so that an output from the ½ circuit 22 is selected, respectively. On the other hand, the comparison circuit 36 switches the switch $SW_3$ depending upon the relationship between the magnitudes of the computed results $D_1$ and $D_2$. Regardless of connection state of the switch $SW_3$, an average value of color signals $C_{n+1}$ and $C_{n-1}$ from the ½ circuit 22 is outputted as a color signal Cn due to above-mentioned switching of the switches $SW_1$ and $SW_2$. Namely, in this case, a signal based on the average value of the upper and lower lines is outputted as a color interpolation signal.

On the contrary, in the case shown in FIG. 2B, there is a high correlation between luminance signals $Y_{n-1}$, Yn and $Y_{n+1}$. For this reason, computed results $D_1$ and $D_2$ indicate a value smaller than a predetermined level. In this case, a larger one of the computed results $D_1$ and $D_2$ is inputted from the maximum value detection circuit 32 to the comparison circuit 46. On the other hand, a smaller one thereof is inputted from the minimum value detection circuit 34 to the comparison circuit 48. Both computed results are considered to be below the reference values $T_1$ and $T_2$. For this reason, an output of high level is provided from the comparison circuit 46 to switch the switches $SW_1$ and $SW_2$ through the logical sum circuit 42 so that an output from the ½ circuit 22 is selected. On the other hand, the comparison circuit 36 switches the switch $SW_3$ depending upon the relationship between the magnitudes of the computed results $D_1$ and $D_2$. Regardless of connection state of the switch $SW_3$, an average value of color signals $C_{n+1}$ and $C_{n-1}$ outputted from the ½ circuit 22 is outputted as a color signal Cn. Namely, in this case too, a signal based on the average value of the upper and lower lines is outputted as a color interpolation signal.

On the contrary, in the case shown in FIG. 2C, there is a high correlation between luminance signals $Y_{n-1}$ and Yn and there is a low correlation between luminance signals Yn and $Y_{n+1}$. For this reason, the computed result $D_1$ indicates a value smaller than a predetermined level, and the computed result $D_2$ indicates a value larger than the predetermined level. In this case, the computed result $D_2$ is inputted from the maximum value detection circuit 32 to the comparison circuit 46, and the computed result $D_1$ is inputted from the minimum value detection circuit 34 to the comparison circuit 48. Since it is here considered that the computed result $D_2$ is above the reference value $T_1$ and the computed result $D_1$ is below the reference value $T_2$, no output of high level is provided from the comparison circuits 46 and 48. For this reason, switches $SW_1$ and $SW_2$ are switched so that color signals $C_{n-1}$ and $C_{n+1}$ are selected, respectively. On the other hand, since the computed result $D_1$ is smaller than the computed result $D_2$, the comparison circuit 36 outputs a signal of high level and causes the switch $SW_3$ to select the color signal $C_{n-1}$ from the switch $SW_1$. For this reason, the color signal $C_{n-1}$ is outputted as a color signal Cn. Namely, in this case, a signal based on the upper line is outputted as the color interpolation signal.

On the other hand, in the case shown in FIG. 2D, there is a low correlation between luminance signals $Y_{n-1}$ and Yn and there is a high correlation between luminance signals Yn and $Y_{n+1}$. For this reason, the computed result $D_1$ indicates a value larger than a predetermined level, and the computed result $D_2$ indicates a value smaller than the predetermined level. Accordingly, the computed result $D_1$ is inputted from the maximum value detection circuit 32 to the comparison circuit 46, and the computed result $D_2$ is inputted from the minimum value detection circuit 34 to the comparison circuit 48. In this case, it is considered that the computed result $D_1$ is above the reference value $T_1$ and the computed result $D_2$ is below the reference value $T_2$. For this reason, no output is provided from the comparison circuits 46 and 48. Switches $SW_1$ and $SW_2$ are switched so that color signals $C_{n-1}$ and $C_{n+1}$ are selected, respectively. On the other hand, since the computed result $D_2$ is smaller than the computed result $D_1$, the comparison circuit 36 outputs a signal of low level and causes the switch $Sw_3$ to select the color signal $C_{n+1}$ from the switch $SW_2$. For this reason, the color signal $C_{n+1}$ is outputted as a color signal Cn. Namely, in this case, a signal based on the lower line is outputted as a color interpolation signal.

In other words, the operation of the amplitude comparison circuit 44 is performed to control the switches $SW_1$, $SW_2$ and $SW_3$ in such a manner that when both the correlation between the luminance signals Yn and $Y_{n-1}$ and the correlation between the luminance signals Yn and $Y_{n+1}$ are lower than a value related with the reference value $T_2$ or higher than a value related with the reference value $T_1$, the average value of the color signals $C_{n-1}$ and $C_{n+1}$ is selected as the color interpolation signal, and when at least one of the correlation between the luminance signals Yn and $Y_{n-1}$ and the correlation between the luminance signals Yn and $Y_{n+1}$, the color signal $C_{n-1}$ or $C_{n+1}$ which corresponds to the luminance signal $Y_{n-1}$ or $Y_{n+1}$ having higher correlation with the luminance signal Yn is selected as the color interpolation signal Cn.

By conducting a control as stated above, where the interpolation luminance signal has a high correlation with the upper or lower line, there will be carried out so called a 0-th order interpolation. That is, as an interpolation signal of a color signal, a color signal of the upper or lower line is emploied as it is. This can eliminates inconveniences in an improvement of the picture quality such as color bleeding, or color missing, etc.

In the above-mentioned embodiment, an explanation has been made by taking an example, as an intrafield interpolation method, of a so called linear interpolation to take an average value of color signals of the upper and lower lines. However, this invention is not limited to the above-mentioned interpolation method, but may be applied other interpolation methods as a matter of course.

The determination of the color signal of the interpolation signal is made by the correlations between a luminance signal of the interpolation line and luminance signals of the upper and lower line thereof, i.e., the luminance signal processing. Thus, such a processing can be carried out with a simplified circuit.

What is claimed is:

1. A television signal processing device for converting an interlaced scanning television signal to a progressive scanning television signal, which comprises:
   luminance signal output means for alternately outputting an interlaced scanning actual line luminance signal and an interpolation line luminance signal for making an interpolation between interlaced scanning actual lines on the basis of an actual line luminance signal of an inputted interlaced scanning television signal;
   color signal output means for alternately outputting an interlaced scanning actual line color signal and an interpolation line color signal for making an interpolation between interlaced scanning actual lines on the basis of an actual color signal of said inputted interlaced scanning television signal; and
   control means for controlling said color signal output means;
   said color signal output means including interpolation output changeover switch which is switched to one of first, second and third positions in response to an output from said control means, and outputting an average value signal of color signals of a pair of adjacent interlaced scanning actual lines at said first position, a color signal of an actual line preceding said interpolation line by one line at said second position, and a color signal of an actual line succeeding said interpolation line by one line at said third position,
   said control means having a first correlation detector which detects a first correlation between said interpolation line luminance signal and a luminance signal of an actual line preceding said interpolation line by one line, and a second correlation detector which detects a second correlation between said interpolation line luminance signal and a luminance signal of an actual line succeeding said interpolation line by one line, and controlling said changeover switch so that, when both the first and second correlations are lower than a first predetermined value or higher than a second predetermined value, said changeover switch is located at said first position; and that when at least one of the first and the second correlation falls within the range from said first predetermined value to said second predetermined value, said changeover switch is located at said second position or at said third position dependent on whether said first correlation is higher than or lower than said second correlation, respectively.

2. A device as set forth in claim 1, wherein said control means is operative to determine a first absolute value of a difference between said interpolation line luminance signal and the luminance signal of the actual line preceding said interpolation line by one line and a second absolute value of a difference between said interpolation line luminance signal and the luminance signal of the actual line succeeding said interpolation line by one line, respectively, whereby when either of a first condition that a larger one of said first and second absolute values is smaller than a first reference value determined in advance and a second condition that a smaller one thereof is larger than a second reference value determined in advance is satisfied, said control means switches said switch of said color signal output means so that it is located at said first position, when said first absolute value is smaller than said second absolute value and neither said first condition nor said second condition is satisfied, said control means switches said switch so that it is located at said second position, and when said first absolute value is larger than said second absolute value and neither said first condition nor said second condition is satisfied, said control means switches said switch so that it is located at said third position.

3. A device as set forth in claim 1, wherein said control means receives, from said luminance signal output means, luminance signals of a pair of interlaced scanning actual lines and an interpolation line luminance signal for interpolating said pair of actual lines.

4. A device as set forth in claim 1, which further comprises selector means operative to select an actual line luminance signal before one field when there is no motion in a pictorial image as said interpolation line luminance signal outputted from said luminance signal output means, and to select an average value signal of a pair of adjacent interlaced scanning actual line luminance signals when there is a motion in said pictorial image as said interpolation line luminance signal.

5. A device as set forth in claim 1, wherein said control means comprises:
- first means for providing an absolute value of a difference between said interpolation line luminance signal and the luminance signal of the actual line preceding said interpolation line by one line;
- second means for providing an absolute value of a difference between said interpolation line luminance signal and the luminance signal of the actual line succeeding said interpolation line by one line;
- first comparison means for comparing a larger one of outputs from said first and second means with said first reference value;
- second comparison means for comparing a smaller one of outputs from said first and second means with said second reference value;
- third comparison means for comparing respective outputs from said first and second means; and
- OR means for providing an OR logic of respective outputs from said first and second comparison means.

6. A device as set forth in claim 5, wherein said changeover switch of said color signal output means comprises:
- first and second switches switched by an output from said OR means; and
- a third switch switched by an output from said third comparison means.

7. A device as set forth in claim 6,
- wherein said first switch selects either a color signal of an actual line preceding said interpolation line by one line or an average signal of a pair of actual line color signals preceding and succeeding said interpolation line by one line,
- wherein said second switch selects either a color signal of an actual line succeeding said interpolation line by one line or said average signal; and
- wherein said third switch outputs, as an interpolation line color signal, either of outputs from said first and second switches.

8. A device as set forth in claim 7, wherein said color signal output means comprises:
- addition means for adding said inputted interlaced scanning actual line color signal and a signal obtained by delaying said color signal by one line;
- division means for dividing an output from said addition means into a value one half thereof.

* * * * *